Sept. 1, 1953
J. H. RENTFROW
2,650,531
YIELDABLE VINEYARD HOE ATTACHMENT
FOR EARTHWORKING IMPLEMENTS
Filed June 10, 1950
3 Sheets-Sheet 1
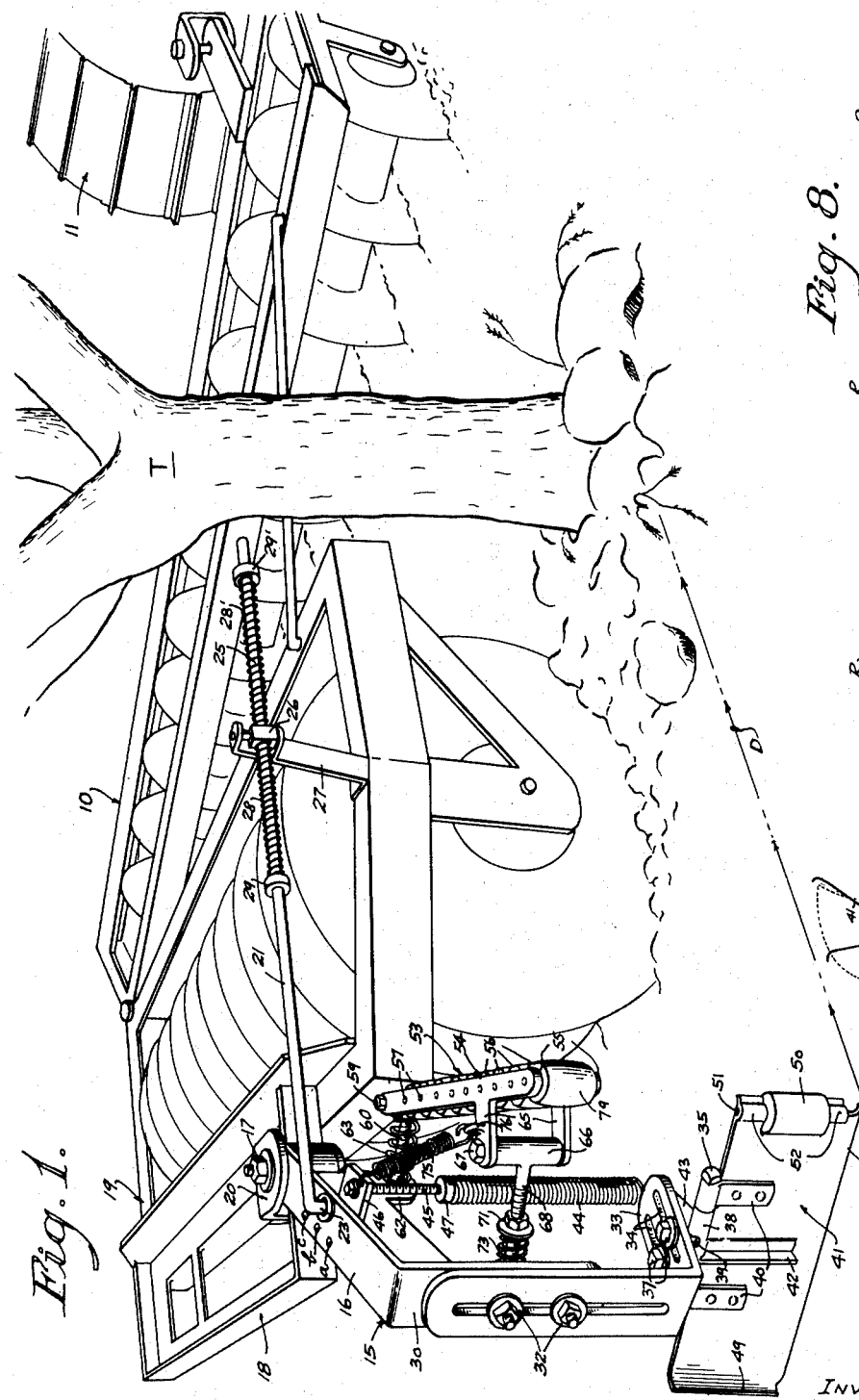
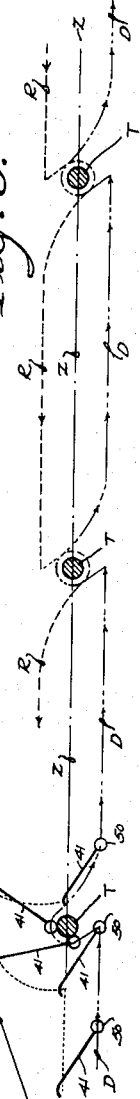
INVENTOR:
James H. Rentfrow
By: Leslie M. Hansen
HIS ATTORNEY.

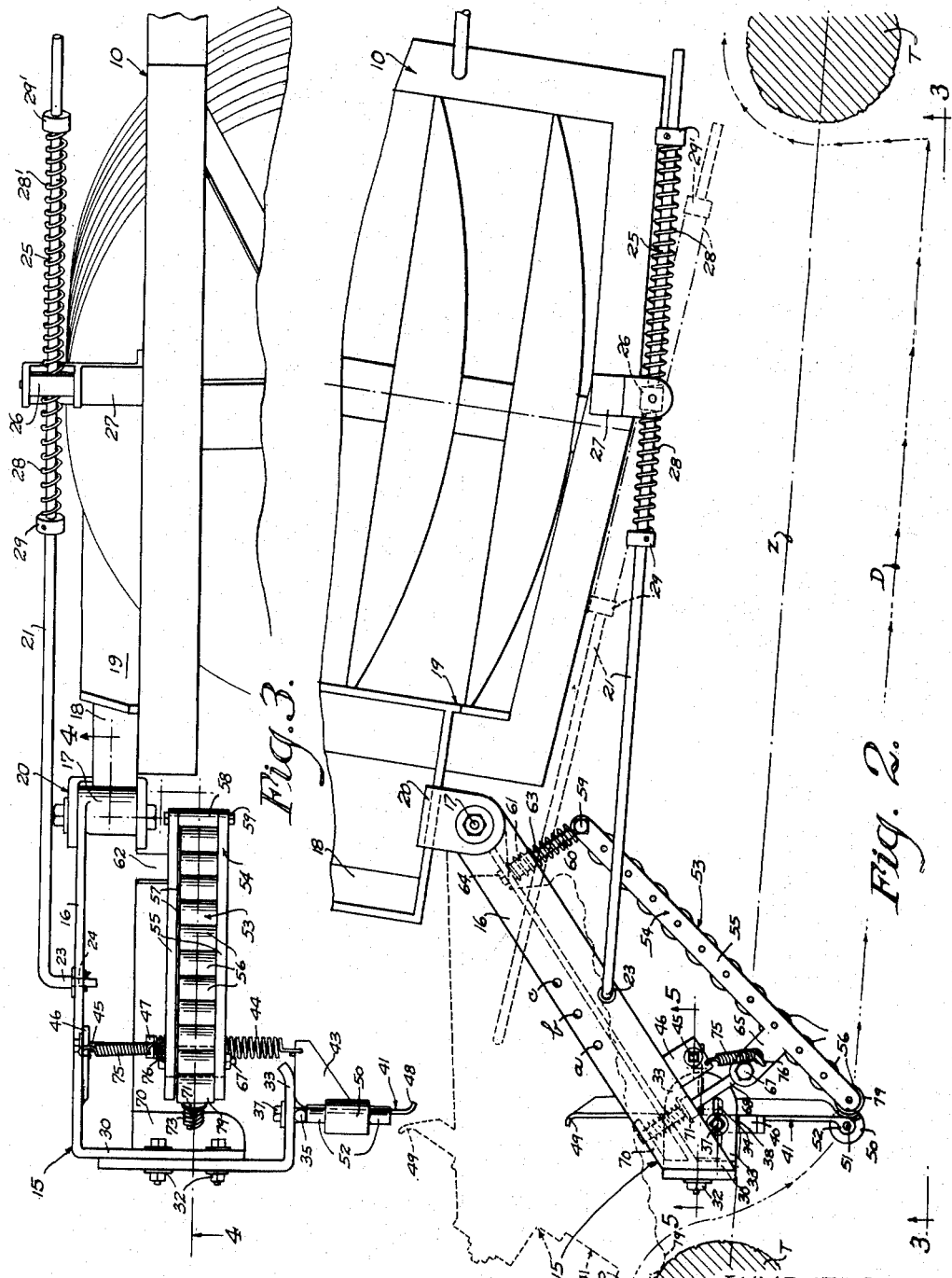

Sept. 1, 1953   J. H. RENTFROW   2,650,531
YIELDABLE VINEYARD HOE ATTACHMENT
FOR EARTHWORKING IMPLEMENTS
Filed June 10, 1950   3 Sheets-Sheet 3

INVENTOR:
James H. Rentfrow
By Leslie M. Hansen
HIS ATTORNEY.

Patented Sept. 1, 1953

2,650,531

UNITED STATES PATENT OFFICE 2,650,531

YIELDABLE VINEYARD HOE ATTACHMENT FOR EARTH-WORKING IMPLEMENTS

James H. Rentfrow, Hollister, Calif.

Application June 10, 1950, Serial No. 167,366

7 Claims. (Cl. 97—137)

This invention relates to plows and more particularly to French plows of the type employed for cultivating as close as possible to the trunk of a tree or vine. The device of this invention is best adapted as an attachment for earth working implements. In the present disclosure I have shown my device associated with a disc.

One of the objects of this invention is to provide a plow attachment for cultivating the earth between trees in an orchard.

Another object is to provide an auxiliary hoe for use with a disc or harrow for cultivating earth in alignment with orchard trees simultaneous with the cultivation of the earth between the rows of such trees.

Yet another object of this invention is to provide a plow attachment which extends laterally between trees in a row with buffer control whereby the earth working portion of the attachment partially circumscribes the base of each tree trunk as the plow is drawn past such tree.

Still another object of this invention is to provide a plow attachment which is articulate for yielding movement about horizontal and vertical linkages to thereby conform to the contour and configuration of stationary objects past which it is drawn.

These and other objects and advantages of the present invention will become apparent in the following description read in the light of the drawings in which:

Fig. 1 is a perspective view showing my new plow attachment associated with a conventional discing implement.

Fig. 2 is a plan view of the attachment as seen from above in Fig. 1.

Fig. 3 is an elevation of Fig. 2 as seen from line 3—3 thereof.

Fig. 8 is a diagrammatic illustration of the path traversed by the hoe portion of the present invention.

Figure 4:
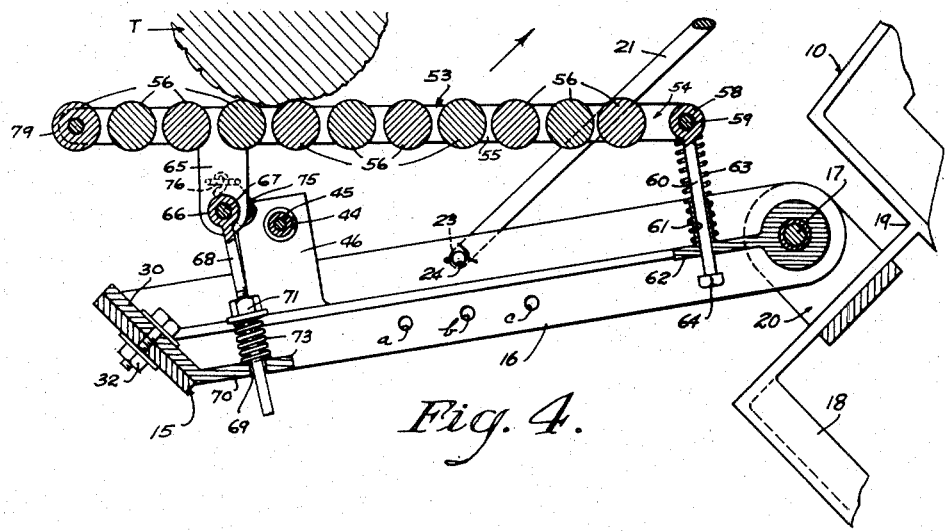
Fig. 4 is a horizontal section of Fig. 3 taken along line 4—4 and in the direction of the arrows 4—4 thereof.

Referring now to Fig. 1, a conventional discing implement 10 is shown connected to a tractor 11 for movement past a tree T. The disc 10 is drawn in a path parallel to a row of trees and as shown in Fig. 1 clods of dirt and sprigs of cover crop surround the base or ball of the tree trunk. Such conditions result after dormant season and after irrigation of an orchard. While it is possible to disc the earth reasonably close to the base of a tree in four right angular directions relative to such tree, manual hoeing or some other form of cultivation is necessary to aerate the soil around the ball of the tree trunk. Such aeration is important to the health and productivity of fruit bearing trees and is a must if the tree is to be maintained and nurtured over a number of seasons.

Numerous devices have been developed to accomplish hoeing of the earth around a tree ball simultaneously with the discing of the earth between rows of such trees. The present invention resides in an improved hoeing attachment 15 for discing implements or the like for hoeing right up to and around a tree ball in a novel and simple manner.

The hoeing attachment 15 comprises a main arm 16 pivotally mounted as at 17 on a rearward extension 18 of the frame 19 of the discing implement 10. The disc 10 being drawn in a direction parallel to a row of trees, has a boss 20 for the mounting 17 located at one side of its rearward extension 18 so that the arm 16 extends laterally of the frame 10 across the line in which the trees are arranged. The arm 16 is connected to a tie rod 21 having one end 23 bent downwardly for insertion through a hole 24 formed in the arm 16 and its opposite end 25 slidably mounted in a sleeve 26 swivelly mounted in a bracket 27 carried by the frame 19 forwardly of the arm 16. A compression spring 28 and 28' is mounted on the rod 21 fore and aft, respectively, of the sleeve 26 and suitable collars 29 and 29' secured to the rod maintain the respective springs in proper tension against the sleeves. In this manner the arm 16 is held in the aforementioned lateral disposition relative to the disc frame 19 and for yielding movement out of and into such disposition upon meeting and passing an obstruction such as a tree.

In connection with the foregoing it will be noted that the arm 16 has several additional holes, *a*, *b* and *c* adjacent the hole 24 in which the end 23 of the rod 21 is hooked. These additional holes *a*, *b* and *c* provide different anchorages for the bent end 23 of the rod to suit various conditions of the soil when the cultivating is done. For example, the compression springs 28—28' are set to counteract the force of resistance of the hoe attachment relative to the soil it engages.

When heavier soil is engaged the resistance is greater and hence greater leverage is required in order to maintain the arm 16 in laterally extended position. In such case the bent end 23 of rod 21 is hooked into the hole a furthermost from the pivot 17 of the arm. When lighter soil is engaged by the hoe attachment the rod 21 is hooked in the hole c closest to the pivot. Intermediate positions such as holes b and 24 attain comparable counterbalance of the spring loaded tie rod to assure proper reaction and yieldability of the arm 16 dependent upon the condition of the soil under cultivation.

The free end 30 of the arm 16 is bent downwardly in parallelism with the axis of the pivot mounting 17 and is preferably angularly disposed rather than at right angles relative to the arm 16. In other words, the free end 30 is disposed with its inner broad face substantially perpendicular to the path of movement thereof.

The free end 30 of arm 16 has a tool carrying extension secured thereto by bolt and slot connection 32 for lengthening and shortening the vertical end 30 as desired. This extension has a horizontal foot 33 provided with a pair of slots 34 coextensive with the foot 33.

A hinge pin 35 having radially extending bolts 36 is secured to the foot 33. The bolts 36 extend through the slots 34 to receive nuts 37 whereby to secure the pin 35 to the foot 33. The slots 34 are of sufficient width to permit angular disposition of the pin 35 relative to the extended foot 33. A hinge sleeve 38 is pivotally mounted on the pin 35 and is slotted as at 39 to permit swinging of the sleeve relative to the pin.

Figures 5, 6, 7:
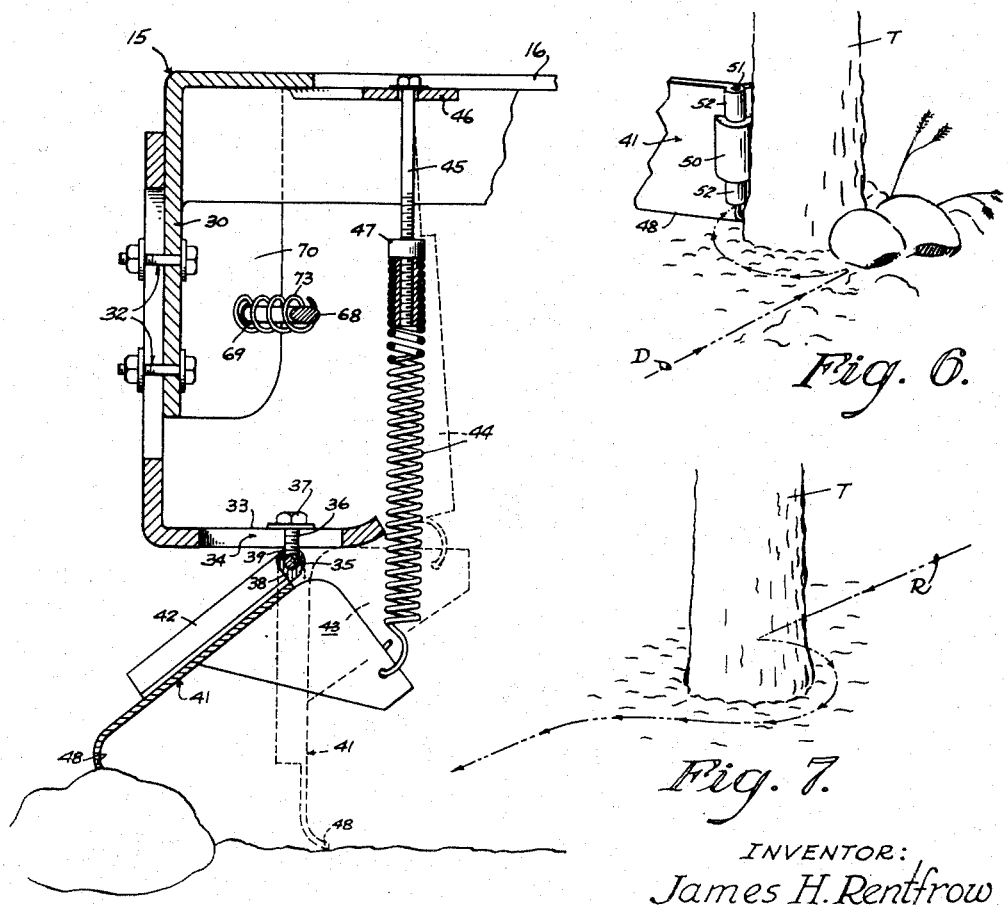
Fig. 5 is a vertical section of Fig. 2 taken along line 5—5 thereof.
Fig. 6 is a fragmentary delineation illustrative of the effect of the present invention upon the earth around a tree trunk.
Fig. 7 is an illustration similar to Fig. 6 showing the complete effect.

A pair of hinge wings 40 are connected to the hinge pin 35 and secured by rivets to a blade 41 forming a hoe. This blade 41 normally hangs downwardly from the hinge pin to engage earth for scraping the latter in a line parallel to the path of travel of the discing implement. The hoe blade 41 is reinforced by an angle iron 42 welded or otherwise secured to its back face as seen in Figs. 1 and 5.

Means for maintaining the hoe blade vertical comprises a web 43 extending perpendicular to and forwardly of the front face of the blade 41 and a tension spring 44 having its lower end connected to the web 43 and its upper end secured to a screw shaft 45 anchored to a plate 46 carried by the main arm 16. The arrangement is such that the spring 44 pulls the web 43 up into engagement with the lower surface of the foot 33, see Figs. 3 and 5. The tension of the spring 44 is variable by adjustment of its anchor collar 47 along the screw shaft 45 to thereby counteract the normal resistance offered by the soil engaged by the hoe blade 41. However, as illustrated in Fig. 5, should the hoe 41 strike an obstruction such as a firmly embedded rock or the like, the spring 44 yields to permit the hoe to glide over such obstruction. In this manner the hoe will not become damaged or unduly bent when meeting with an obstruction.

The blade 41 has its lower edge 48 bent forwardly and preferably sharpened to scrape the earth engaged thereby. The trailing edge 49 of the hoe blade is curved rearwardly so as to be disposed substantially tangent to its line of travel (see Fig. 8) when between trees. The forward or leading edge of the blade 41 carries a roll 50 mounted on a vertical pin 51 suitably secured to upper and lower ears 52 on the hoe blade. This leading roll 50 is adapted to engage the trunk of a tree so as to guide the blade around the tree trunk as the implement and attachment are drawn past such tree.

It will be noted in Figs. 2 and 8 that the hoe blade 41 extends well beyond the center line of the row of trees under cultivation. Consequently, the leading roll 50 would not normally engage the tree trunk and the hoe blade would ordinarily become hooked around the trunk of a tree. However, a buffer guard 53 is provided on the forward side of the attachment 15 to engage the trunk of a tree and automatically cause initial rearward pivoting of the main arm 16 and the hoe blade 41 so that the roll 50 finally engages the tree trunk as the attachment passes the latter.

This buffer guard 53 comprises a frame 54 yieldably mounted on the main arm 16 in a position to cooperate with the roll 50 carried by the hoe blade 41 in disposing the latter properly relative to the tree trunk for partially circumscribing the latter in the course of movement past the same. Moreover, this buffer guard is so constructed as to cause no damage to the tree trunk while engaging and passing the same even though the resistance offered by such tree trunk is employed in initially forcing the main arm 16 out of its normal line of travel against the action of the counterbalancing compression springs 28 and 28', hereinbefore referred to. In this connection it should be understood that the resistance offered by the earth engaging the hoe blade 41 is additive to the resistance offered by a tree trunk engaged by the buffer guide to thereby lessen the bearing force of the buffer guide against the tree trunk.

The yieldably mounted frame 54 comprises a pair of arms 55 spaced horizontally from each other by a plurality of rollers 56 having their peripheries extending radially beyond the arms 55. These rollers 56 have pintles 57 supported by the upper and lower arms 55 for rolling motion relative thereto.

The ends of arms 55 nearest the pivot mounting 17 of the main arm are secured to a spacer boss 58 by a bolt 59, the boss 58 having a rod 60 extending therefrom through an enlarged sleeve 61 formed on a depending portion 62 of the main arm 16. A compression spring 63 seated against the portion 62 surrounds the rod 60 so that the opposite end of the spring 63 bears against the boss 58 to urge the latter away from the main arm 16. The rod 60 has a nut 64 on its free end for preventing the spring 63 from pulling the rod 60 clear out of the sleeve 61.

Each of the upper and lower arms 55 have a rearwardly extending portion 65 between which a boss 66 is pivotally secured by a bolt 67. The boss 66 has a rod 68 extending therefrom through an opening 69 formed in a brace plate 70 formed between the horizontal and downwardly extending portion of the main arm 16, see Figs. 4 and 5. The free end of rod 68 is threaded and has a nut and washer 71 thereon adapted to bear against one end of a compression spring 73. The spring 73 encircles the rod 68 and bears against the brace plate 70 for urging the boss 66 and the arms 55 away from the main arm 16. The length of the compression spring 73 relative to the rod 68 is such that a sufficient portion of the rod 68 extends beyond the brace plate 70 when the spring 73 is fully extended. The nut and washer 71 are adjustable to change the normal extension of the rod from the main arm to thereby position the buffer guide rollers in a proper position in advance of the hoe blade and its roll 50.

The rod 68 fits loosely in the hole 69 formed in the brace plate and ordinarily the free or outer end of the buffer frame 54 would tend to sag. However, this is overcome by a tension spring 75, the lower end of which is hooked onto an eye 76 on the portion 65 of the lower arm 55, the upper end of the spring 75 being anchored to the plate 46 carried by the main arm 16. In this manner the buffer frame 54 is held up in horizontal position for movement toward and from the main arm 16 by the guided movement of the rods 60 and 68 at the inner and outer ends of the buffer guard 53.

Operation

The attachment of the present invention, when in use, is normally disposed in the position illustrated in Figs. 1 and 2. In this position the implement 10, with which the attachment is associated, is drawn in a path parallel to a row of trees T standing along a line Z, see Figs. 2 and 8.

The main arm 16 extends rearwardly and laterally from the frame 18 of the implement so that the far end of the main arm is disposed to travel substantially along the line Z. In this manner the hoe blade 41 is disposed with its main body traversing the line Z and more or less angularly disposed relative thereto, dependent upon the setting of the hinge pin 35 relative to the foot 33 and the anchorage of the tie rod 21 in one or the other of the holes a, b, c or 24 in the main arm 16.

The tie rod 21 is yieldingly held in a predetermined position relative to the swivelly mounted sleeve 26 by the counter-balance springs 28—28' to maintain the main arm 16 in the position just above explained. In this manner the hoe 41 slides through the earth between trees to adequately aerate the soil and to leave the surface thereof in a smooth and clean condition.

It will be noted in Figs. 1 and 2 that the outermost roller 79 at the far end of the buffer guard is slightly in advance of the roll 50 on the leading end of the hoe blade. Consequently, the buffer guard which is yieldingly held in advance of the main arm 16 is the first part of the attachment to engage a tree. Since the buffer guard is angularly disposed relative to its path of travel, i. e., its outermost end being rearwardly disposed, there is a natural tendency for the buffer guard to sweep around the tree engaged thereby.

The shock of the engagement of the attachment 15 with the trunk of a tree is cushioned by the yieldability of the buffer guard relative to the main arm. This is illustrated from below in Fig. 4 in which the buffer guard is shown to have yielded partially due to the obstructing force of the tree it engages. Consequently, as the force thus created increases, the main arm is gradually urged rearwardly against the action of the counter-balancing springs 28—28'. Meantime the rollers 56 on the buffer guard, engaging the periphery of the tree trunk, ride around the same without scraping or scarring the same. If desired, the rollers 56 can be covered with rubber to thereby further guard against unduly marring the bark on the tree trunk engaged thereby.

The counter-balancing spring 28' yields as the buffer guard and arm 16 are forced rearwardly until finally the roll 50 at the leading end of the hoe blade 41 engages the tree trunk substantially at the line Z. Thereafter the hoe 41 is guided around one half of the tree trunk while scraping the earth in its path clean, see dotted lines Fig. 2 and full line illustration Fig. 6.

As the implement 10 continues to move forwardly, the distance between the pivot mounting 17 and the tree it is passing increases until such distance is sufficient to permit the arm 16 to swing back to its normal extended position by the action of the counter-balancing spring 28'. In this connection it will be noted that the other spring 28 on the tie rod 21 acts as a shock absorber. In other words, should there be very little resistance offered the hoe when it and the arm 16 is free to swing into normal extending position, the spring 28 retards the momentum of the forwardly swinging arm and hoe.

In the foregoing manner the rearwardly curved edge 49 of the hoe blade 41 follows the path shown in fine dotted lines at the left in Fig. 8, while the roll 50 at the leading edge of blade 41 travels half way around the trunk of the tree it engages. The path of the leading roll from left to right in Fig. 8 is delineated by the dot-double-dash arrows D, see also Fig. 2. Consequently, as soon as the main arm 16 is free to swing back to its normal extended position as just above explained, the hoe blade sweeps back into a position transversely of the line Z until the next tree trunk is engaged. Thereupon the same operation and movement as hereinabove explained is repeated and so on to the end of the row of trees.

The tractor and implement are then turned for movement parallel to the line Z but on the opposite side of the row of trees. Upon this return movement the hoe 41 again partially circumscribes each tree trunk to clear away the clods of dirt. This is exemplified by the dotted line arrows R in Fig. 8 and by comparing Fig. 7 with Fig. 6. Fig. 1 illustrates the condition of the soil around a tree trunk about to be cultivated. Fig. 6 exemplifies the initial hoeing around the tree of Fig. 1, however, in Fig. 6 it will be noted that lumps of earth and sprigs of cover crop are left on the far side of the tree as the hoe passes in one direction. After the hoe passes in the opposite direction and along the opposite side of the tree, the lumps of earth in Fig. 6 will have been removed with the result that the earth around the tree will appear substantially as depicted in Fig. 7.

From the foregoing it will be apparent that I have provided an auxiliary hoe for use with an earth working implement for cleanly hoeing and aerating the earth around the base of a tree simultaneously with the cultivation of the earth between rows of trees.

While I have described my improved hoeing attachment in detail, it will be apparent that it is susceptible to variations, modifications and alterations without departing from the spirit of my invention. I therefore desire to avail myself of all variations, modifications and alterations as fairly come within the purview of the appended claims.

What I claim as new and desire to protect by Letters Patent is:

1. An attachment for an earth working implement comprising a main arm pivotally mounted on said implement for extension laterally therefrom, means for yieldingly holding said main arm in laterally extended position from said implement, said arm having a downturned portion, a vertical arm secured to said downturned portion and having a forwardly extending foot, a hoe blade pivotally secured to said foot, a web extending forwardly of said blade for engaging said foot to limit forward swinging movement thereof, tensioning means having one end secured to said web and its opposite end anchored to said main frame for yieldingly holding said hoe blade in its foremost position, and roller means on the leading edge of said hoe blade for engaging the trunk of a tree for guiding said hoe blade for movement partially around said tree trunk during movement of said implement and its attachment past said tree.

2. The combination with an earth working implement movable adjacent a row of trees in an orchard, of a hoe attachment comprising an arm pivotally mounted on said implement for effecting horizontal swinging movement of said arm, a swivel block on said implement forwardly of said arm, a tie rod having one end secured to said arm and its opposite and slidable in said swivel block, yieldable means on said rod for maintaining said arm in laterally extended position from said implement with the free end of said arm disposed substantially across the line of trees in said row thereof, said arm having a vertical free end, means secured to the free end of said arm for vertical adjustment relative thereto, a hoe blade pivotally secured to said means secured to said arm for pendant disposition, means for urging said hoe blade forwardly relative to said arm, means for limiting forward movement of said hoe blade beyond vertical disposition so that the lower edge of said hoe blade scrapingly engages earth, a buffer guard comprising a plurality of rollers adapted to engage a tree trunk, means for yieldingly mounting said buffer guard on the forward side of said arm for movement toward and from the same so that said rollers initially engage a tree obstructing the path of movement of said arm to cause said arm to swing rearwardly against the action of the yieldable means on said rod, and a vertically disposed roll on the leading edge of said hoe blade adapted to engage the base of said tree trunk as the outermost roller on said buffer guard is in engagement with said tree trunk to thereby guide said hoe blade partially around the base of said tree trunk for scraping the earth cleanly up to the base of said tree.

3. The combination with an earth working implement movable adjacent a row of trees in an orchard, of a hoe attachment comprising an arm having one end pivotally mounted on said implement for swinging movement of said arm in a horizontal plane, a swivel block on said implement, a tie rod having one end secured to said arm and its opposite end slidable in said swivel block, counter-balancing springs on said rod on either side of said swivel block, a collar secured to said tie rod at the ends of said counter-balancing springs for maintaining said springs under predetermined compression to hold said arm in laterally extended position from said implement with the free end of said arm disposed substantially between trees in said row thereof, said arm having a vertical free end, means secured to the free end of said arm for vertical adjustment relative thereto and having a forwardly extending foot, a hoe blade pivotally secured to said foot for pendant disposition therefrom, a tension spring for urging said hoe blade forwardly relative to said arm, means connected to said tension spring for increasing or decreasing the tension thereof, means on said blade engageable with said foot for limiting forward movement of said hoe blade beyond vertical disposition so that the lower edge of said hoe blade engages earth, a buffer guard yieldably mounted on the forward side of said arm for initially engaging the trunk of a tree to cushion the impact of said buffer guard against the tree trunk and to cause said arm to swing rearwardly against the action of the counter-balancing springs on said rod, and roller means on the leading edge of said hoe blade for engaging the base of said tree trunk as said buffer guard is about to pass the same to thereby guide said hoe blade partially around and close to the base of said tree trunk for smoothing the earth around the tree.

4. The combination with an earth working implement movable adjacent a row of trees in an orchard, of a hoe attachment comprising an arm pivotally mounted on said implement for movement in a horizontal plane, a swivel block on said implement, a tie rod having one end secured to said arm and its opposite end slidable in said swivel block, spring means on said rod on either side of said swivel block, means secured to said tie rod remote from said swivel block for maintaining said spring means in engagement with said swivel block and under predetermined compression to thereby yieldably hold said arm in laterally extended position from said implement with the free end of said arm disposed substantially between trees in said row thereof, said arm having a vertical free end, a forwardly extending foot secured to the free end of said arm for vertical adjustment relative thereto, a hoe blade pivotally secured to said foot for pendant disposition therefrom, means for urging said hoe blade forwardly relative to said arm, means for limiting forward movement of said hoe blade beyond vertical disposition so that the lower edge of said hoe blade scrapingly engages earth, a buffer guard carried by said arm for initially engaging the trunk of a tree to cause said arm to swing rearwardly against the action of the spring means on said rod, and roller means on the leading edge of said hoe blade for engaging the base of said tree trunk as said buffer guard is about to pass the same to thereby guide said hoe blade partially around and close to the base of said tree trunk.

5. In an auxiliary plow attachment for earth working implements, said attachment including a main arm swingably mounted on said implement and yieldingly maintained in laterally extending position from said implement, and said arm having an earth engaging blade on its free end adapted to travel between trees in a row adjacent which said implement is drawn; the combination therewith of a buffer guard comprising a pair of arms spaced from each other by a plurality of rollers disposed for turning about parallel vertical axes, a first trunnioned rod extending rearwardly from the inner ends of said pair of arms, a second trunnioned rod extending rearwardly adjacent the outer ends of said pair of arms, said main arm having guideways formed therein for receiving said first and second trunnioned rods, spring means on said trunnioned rods for holding said plurality of rollers in advance of said main arm for initially engaging the trunk of a tree to thereby cushion the impact of said main arm relative to a tree trunk obstructing the same and for effecting rearward yielding movement of said main arm during movement of said implement past a tree trunk, and means on said earth engaging blade for rollingly engaging the base of a tree trunk as the outermost roller between said pair of arms engages the trunk of said tree whereby said blade partially circumscribes the base of said tree trunk.

6. An auxiliary plow attachment for earth working implements comprising a horizontally swingable arm having one end pivotally mounted on said implement, means between said implement and said arm for yieldingly holding the latter in lateral rearward extension from said implement between trees in a row thereof being passed by said implement, a mounting foot mounted for vertical adjustment on the outer end of said arm, a hoe blade pivotally supported from said foot for fore and aft swinging movement relative thereto so as to traverse a line extending from center to center of the trees in said row thereof, web means on the forward face of said blade engageable with said foot for limiting forward swinging movement of said blade beyond vertical disposition, a tension spring having its lower end connected to said web means and its upper end secured to a threaded collar, a screw shaft for receiving said threaded collar and having its upper end anchored to said arm for yieldingly maintaining said hoe blade in vertical disposition, and roller means rotatably mounted on a vertical axis formed by ears in the leading edge of said blade for engaging the base of a tree trunk during partial circumvention of said blade relative to and adjacent the base of said tree trunk.

7. An auxiliary plow attachment for earth working implements comprising a horizontally swingable arm having one end pivotally mounted on said implement, means between said implement and said arm for yieldingly holding the latter in lateral rearward extension from said implement between trees in a row thereof being passed by said implement, a mounting foot mounted for vertical adjustment on the outer end of said arm, a hoe blade pivotally supported from said foot for fore and aft swinging movement relative thereto so as to traverse a line extending from center to center of the trees in said row thereof, web means on the forward face of said blade engageable with said foot for limiting forward swinging movement of said blade beyond vertical disposition, a tension spring having its lower end connected to said web means and its upper end secured to a threaded collar, a screw shaft for receiving said threaded collar and having its upper end anchored to said arm for yieldingly maintaining said hoe blade in vertical disposition, roller means rotatably mounted on a vertical axis formed by ears in the leading edge of said blade for engaging the base of a tree trunk during partial circumvention of said blade relative to and adjacent the base of said tree trunk, and a buffer arm yieldingly mounted forwardly of said arm and including a plurality of vertically pinioned rollers for initially engaging the trunk of said tree for gradually urging said arm rearwardly incident to engagement of the base of said tree trunk by said roller means on the leading edge of said blade.

JAMES H. RENTFROW.

References Cited in the file of this patent

UNITED STATES PATENTS

| Number | Name | Date |
|---|---|---|
| 1,744,801 | Rimple et al. | Jan. 28, 1930 |
| 2,096,656 | Stoulil | Oct. 19, 1937 |
| 2,230,766 | Smith | Feb. 4, 1941 |
| 2,506,443 | Court | May 2, 1950 |

FOREIGN PATENTS

| Number | Country | Date |
|---|---|---|
| 19,429 | France | Oct. 19, 1914 |
| | (2nd Addition to No. 428,702) | |
| 124,089 | Switzerland | Jan. 2, 1928 |
| 587,095 | France | Jan. 12, 1925 |
| 703,548 | France | Feb. 9, 1931 |
| 760,230 | France | Dec. 6, 1933 |
| 856,592 | France | Mar. 23, 1940 |